United States Patent [19]

Sakamoto

[11] Patent Number: 4,618,883
[45] Date of Patent: Oct. 21, 1986

[54] METHOD OF EDITING IMAGE SIGNAL
[75] Inventor: Takashi Sakamoto, Kyoto, Japan
[73] Assignee: Dainippon Screen Mfg. Co., Kyoto, Japan
[21] Appl. No.: 711,445
[22] Filed: Mar. 13, 1985
[30] Foreign Application Priority Data Apr. 5, 1984 [JP] Japan .................................. 59-69826

[51] Int. Cl.$^4$ ............................................. H04N 1/46
[52] U.S. Cl. ........................................ 358/78; 358/80
[58] Field of Search ...................... 358/75, 77, 78, 80
[56] References Cited

U.S. PATENT DOCUMENTS 4,060,829 11/1977 Sakamoto ........................ 358/78 X
4,127,871 11/1978 Sakamoto ............................ 358/80
4,270,141 5/1981 Sakamoto .

Primary Examiner—Randall L. Green
Attorney, Agent, or Firm—Brumbaugh, Graves, Donohue & Raymond

[57] ABSTRACT

A method of editing image signal comprising a step of establishing a plurality of pictures elements adjacent to one another on a color original picture to be an unit region of condense, a step of performing condense of image signal so that a representative picture element of said unit region of condense may have all of a plurality of image signals corresponding to color signals required when reproducing the color picture image and that each picture element other than the representative picture elements may have only an image signal corresponding to the brightness signal of said plurality of image signals, and a step of performing editting and rearrangement of the image signal using the condensed image signal, in combination with a step of establishing the unit region of condense to be a minimum unit for designation of coordinate position in the editing, and a step of performing the rearrangement of each image signal by the unit region of condense based on the layout designation under the same coordinate system as the editing.

2 Claims, 12 Drawing Figures

4 PICTURE ELEMENTS   FIG.7(a)

| $M_{11}$ | C | y | k | $M_{00}$ | $M_{01}$ | $M_{10}$ | $M_{11}$ | C | y | k | $M_{00}$ | $M_{01}$ | $M_{10}$ | $M_{11}$ |

4 PICTURE ELEMENTS   FIG.7(b)

| M | C | y | k | $M_{00}$ | $m_{01}$ | $m_{10}$ | $m_{11}$ | C | y | k | $M_{00}$ | $m_{01}$ | $m_{10}$ | $m_{11}$ |

METHOD OF EDITING IMAGE SIGNAL

BACKGROUND OF THE INVENTION (1) Field of the Invention

This invention relates to a method of editing image signal and, more particularly, to a method of editing image signal for use in an image processing system such as layout scanner system in which a plurality of image data such as color plate signals obtained by applying such process as tone correction or magnification change to color separating image signals obtained by scanning sequentially a plurality of color original pictures are once individually stored in a digital memory of large capacity such as magnetic disk memory, those data are read out by each color original picture, reproducing images are editted while being displayed on an interactive CRT monitor, for example, based on the layout designation, and an output unit is controlled according to the edited data so as to obtain the reproduced image by each color plate.

(2) Prior Art

In the known image processing system such as layout scanner system, the image data produced by the system, i.g., a plurality of line drawings and figures such as color picture images having variable density or characters read by the system separately are once written in a memory for provisional storage, and then the editing operation is performed by rearranging the image data respectively at their suitable positions on the memory for editing plate based on the layout designation. In this process, a method for rapidly performing the editing operation while confirming it visually is adopted i.e., in addition to the digital memory of large capacity such as magnetic disk to be a memory for said step of provisionally storing each of read individual image data and that for the step of editing plate, a refresh memory for storing specially condensed image data which are read for interaction with the operator is provided so as to display an image corresponding to the image data on the color monitor.

In this connection, when the color original picture for use in the color layout scanner is written in the memory, even in case of a relatively small-sized one, it is necessary to have the memory of extremely large capacity because of abundance in resolving power and tone thereof, and therefore considering the cost per bit, transfer speed, disposing space, etc., a magnetic disk is conventionally used as said memories.

However, the data transfer speed of the magnetic disk device is not so sufficient that, even though the factors for the optimum arrangement can be decided by the interaction with the color monitor, when the data transfer from the memory for provisional storage to the memory for editing plate is started according to the command of rearrangement, it is necessary for the next step to wait for a while, i.e., the next step is unavoidably delayed and the editing speed of the page as a whole is not improved so much. Even when the editing operation on the color monitor is off-line with the editing operation of magnetic disk data, there still remains a problem that the latter operation takes much time.

In this sense, it may be an idea that since the color picture image having variable density is separated into signals of four color plates C, M, Y, K (or R, G, B, occasionally) in the ordinary graphic arts, the image signal corresponding to each color plate signal is individually stored in 4 (or 3) magnetic disk devices, and another 4 (or 3) magnetic disk devices for editing plate are prepared for the editing operation so as to be operated simultaneously for each color plate, thereby achieving the speed-up in the editing operation. In this case, however, 8 (or 6) magnetic disk devices are required in total, and it is not only uneconomical but the necessary labor for replacing magnetic disk packs after completing the editing operation becomes quadruple.

Thus, the known layout scanner system is not always sufficiently practical and is therefore principally used for creative graphic arts of high value added such as industrial design.

SUMMARY OF THE INVENTION

Accordingly, in order to overcome the above-discussed disadvantages of the known arts, an object of this invention is to provide a novel and practical method of editing image signal for processing the data speedily utilizing the method of condensing data as is disclosed in applicant's Japanese Patent Application laid open under Publication No. Sho 55-22708 in which an unit region of condense being $2 \times 2$ picture elements is established to be an unit of process in the editing operation.

The foregoing object is accomplished by providing a method of editing the image signal comprising a step of establishing a plurality of picture elements, i.g., $2 \times 2$ picture elements adjacent to one another on a color original picture to be an unit region of condense, a step of performing condense of the image signal so that a representative picture element of said unit region of condense may have all of a plurality of image signals corresponding to color signals such as four color plate signals C, M, Y, K required when reproducing the color picture image and that each picture element other than the representative picture element may have only an image signal corresponding to the brightness signal of said plurality of image signals, and a step of performing editing an rearrangement of the condensed image signals written in a memory for provisional storage by each unit region of condense, in combination with a step of establishing said unit region of condense to be a minimum unit for designation of coordinate position in the editing, and a step of performing the rearrangement of the image signals transferred to memory for editing plate based on the layout designation under the same coordinate system as the editing.

Furthermore, according to the method of this invention, when there exists a boundary line for editing in the rearranged single unit region of condense, the color signal of the representative picture element in said unit region of condense is established to be an average of the color signals weighted in proportion to the area occupied in said unit region of condense.

Thus, in accordance with this invention, since the condense image data covering the plurality of picture elements can be transferred collectively in one unit and the editing operation can be performed smoothly for the obtention of the reproducing image on the basis of said condensed image data in contrast to the known method in which the image data is transferred by each one picture element to be edited, it is possible to accelerate the editing speed in proportion to the inverse number of the condensability (rate of condense) subject to the transfer speed. Accordingly, since it is possible to condense the image signal, i.e., the speed-up in the editing operation in proportion to the speed-up in the transfer as well as the decrease in the necessary capacity of the memory for storing the image data, particularly when it is applied to a layout scanner in which a magnetic disk device taking long for the data transfer is used as a memory for editing, the advantage rendered by the method of this invention is considerably large and it becomes possible to provide a practical layout scanner whereby the graphic arts process such as printed matter for advertisement is effectively carried out.

BRIEF DESCRIPTION OF THE DRAWINGS

Other objects, features and advantages of the present invention will be seen in connection with the accompanying drawings in which:

FIG. 2 (a) typically shows the state of the image data in the magnetic disk in case of FIG. 1 (a), and (b) shows the case of FIG. 1 (b) in the same manner;

FIG. 7 (a) typically shows the state of recording image data when the color signals of the representative picture element are applied to the whole unit region of condense, and (b) typically shows the state of recording the image data when the brightness value is condensed;

FIGS. 10-1, 10-2 and 11 are flow charts of FIG. 9.

DESCRIPTION OF THE PREFERRED EMBODIMENTS

Referring now to the accompanying drawings an embodiment of this invention is described in detail hereunder.

Figures 1, 10:
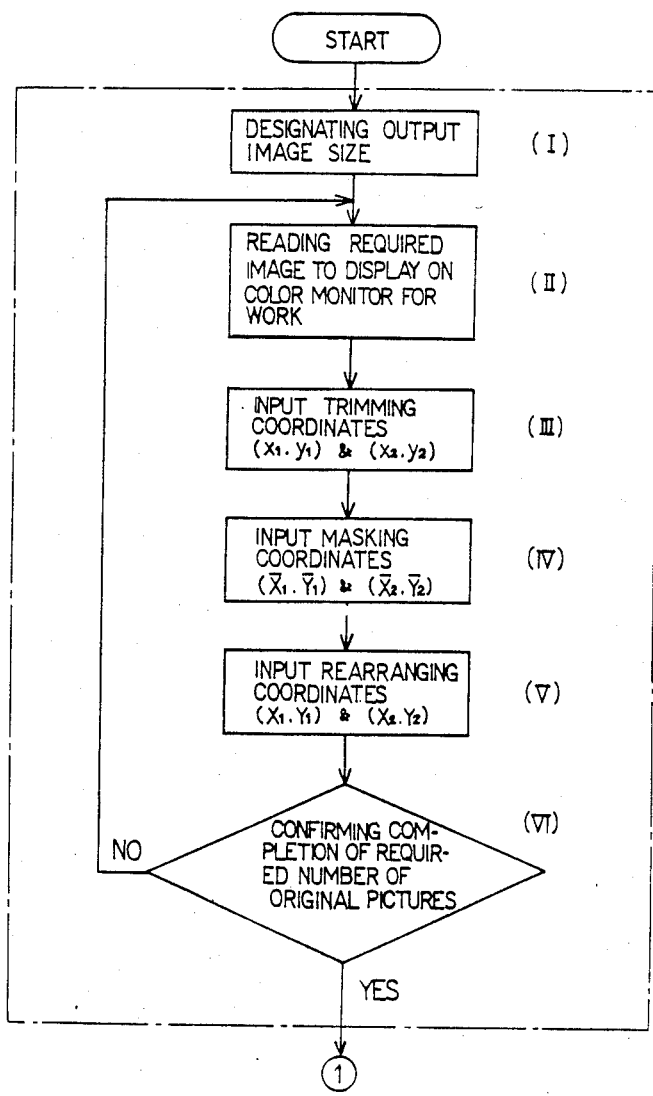
Figures 2, 10:
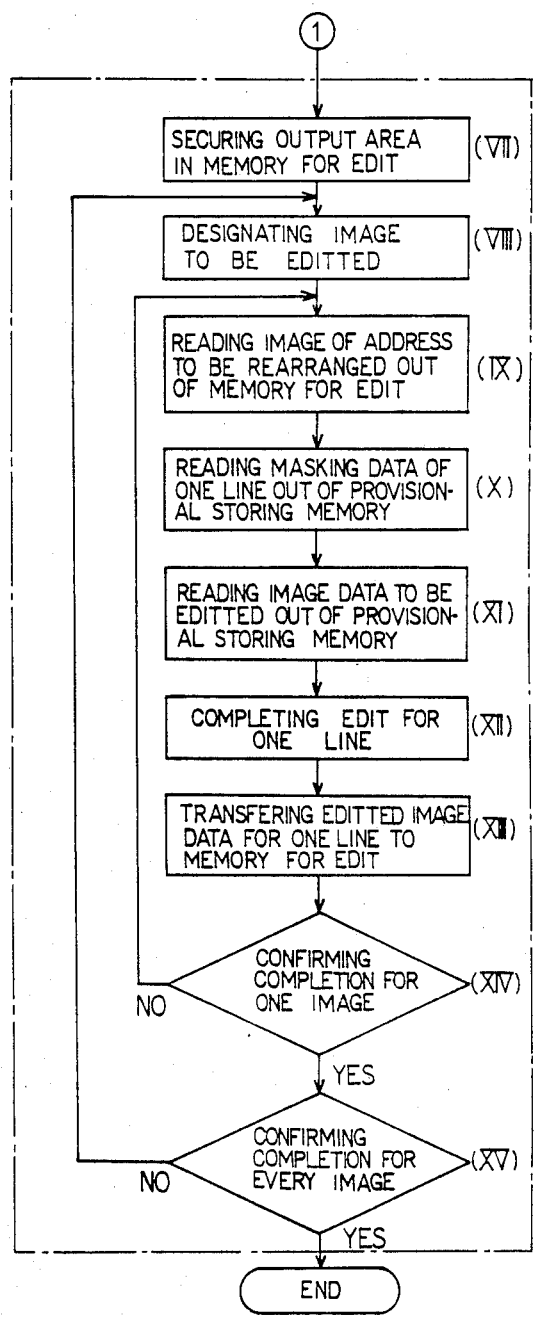

FIG. 1 (a) typically shows the state in which the four color plate signals of cyan (C), magenta (M), yellow (Y) and black (K) are held by each picture element of the color original picture, and FIG. 1 (b) typically shows the state in which establishing a plurality of picture elements, i.e., 2×2 picture elements to be an unit region of condense, only the color plate signal M as a value representing the brightness is held by every picture element in each unit region of condense while the other color plate signals C, Y, K being held only by a representative picture element, thereby condensing the image signal in each unit region of condense. FIG. 2 (a), (b) respectively show the state when the image signals shown in FIG. 1 (a), (b) are written in a memory such as magnetic disk, and in FIG. 2 (a) establishing that each color plate signal is composed of 8 bits of data, 16 bytes are necessary for 4 colors per 2×2 picture elements, while in FIG. 2 (b) only 7 bytes per 2×2 picture elements are sufficient for the capacity of the memory.

Figure 1A:
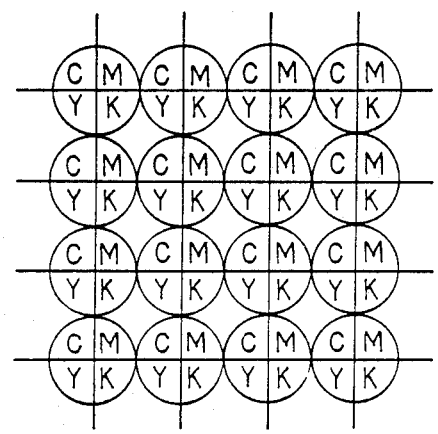
FIG. 1 (a) typically shows a state of picture elements when the image signal is not condensed, and (b) typically shows the image signal which is condensed establishing that 2×2 picture elements are one unit region of condense while keeping a specified relation.
Figure 1B:
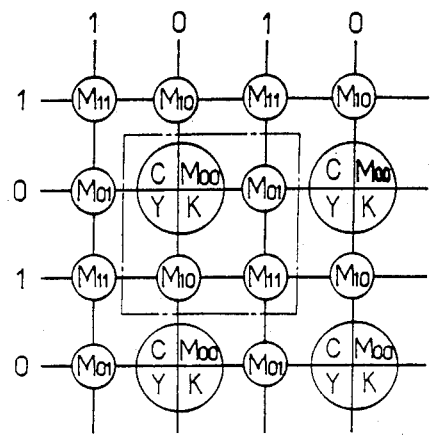
Figure 3:
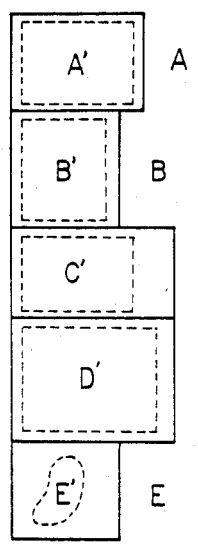
FIG. 3 typically shows the state when the images (A), (B), (C), (D) are input sequentially to the magnetic disk on the side of provisional storage.
Figure 4:
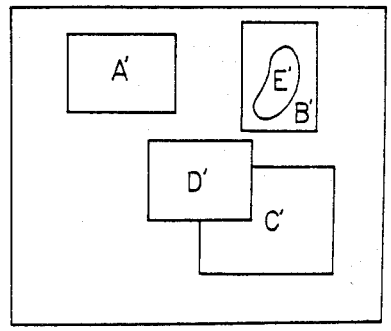
FIG. 4 typically shows the picture image edited in the magnetic disk on the side of rearrangement.

FIGS. 3 and 4, show the editing operation of the image signal condensed establishing that 2×2 picture elements are one unit region of condense.

FIG. 3 typically shows the state in which the images (A), (B), (C), (D), (E) are individually written in the memory for provisional storage such as megnetic disk by means of image input unit. When the image signal is read by the image input unit, the image signals read a little larger than the trimming size necessary for the layout are input as shown in FIG. 3, each size of trimming images (A'), (B'), (C'), (D'), (E') is decided accurately while being confirmed by interaction with CRT color monitor at the time of editing operation, and after confirming the arrangement of the images by means of another color monitor or said color monitor, the image data are transferred to the memory for editing plate.

FIG. 4 typically shows the output picture image written in the memory for editing plate and wherein a designated area of the image signal written in the memory for provisional storage is trimmed and arranged at the designated position of the plate editing side.

In this connection, when the trimming of the image is designated in the directions of main scanning and subscanning, i.e., in the rectangular form along the direction of arranged picture elements as the image (A'), of FIG. 4, the image data are trimmed based on the layout designation establishing that instead of the picture element before the condense, the unit region of condense is always a forcible minimum unit of the designation of the coordinate position in the editing, and thus the rearrangement of the images being performed.

Figure 5:
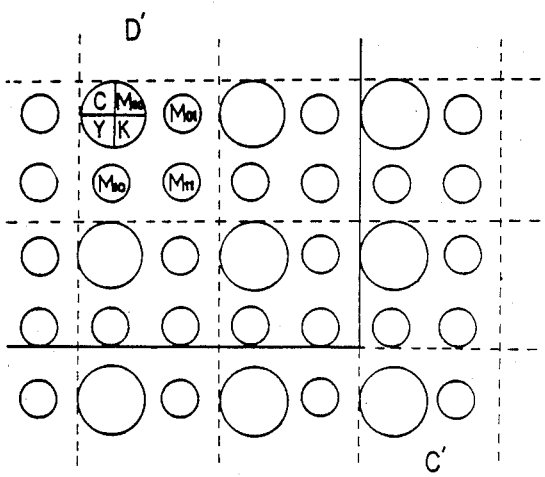
FIG. 5 typically shows the state wherein an unit region of condense and the representative picture element thereof is rearranged by each unit of condense under the same coordinate system in case that two images are superposed each other.

Said manner of trimming and rearrangement is available even when more than two images are superposed or contacted one another at the time of editing. FIG. 4 also shows one example of such cases and wherein a portion of the image (D') is superposed on the image (C'). FIG. 5 shows an enlarged view of said superposed portion. As is clearly shown in FIG. 5, whether more than two images are superposed or separated in their rearrangement, establishing always the unit region of condense to be the minimum unit of the designation of the coordinate position in the editing, the rearrangement is performed under the same coordinate system so that the representative picture element of each image may be located in the same scanning line both in the main scanning direction and the subscanning direction. Consequently, at the time of reproduction of the image, it is not necessary to take care of cut line of the image, and the reproducing image is easily recorded by simply controlling the record unit in the manner of reading the edited and rearranged image signal of the magnetic disk device.

In the actual operation, however, there may be a case wherein, other than the foregoing rectangular trimming, the rearrangement must be performed by picking up the image area surrounded by a closed-loop which includes an oblique line or curve as shown in (E') of FIG. 4. In this case it may be a matter how to process the boundary of each image or the boundary between the images, which is described hereunder.

Figure 6A:
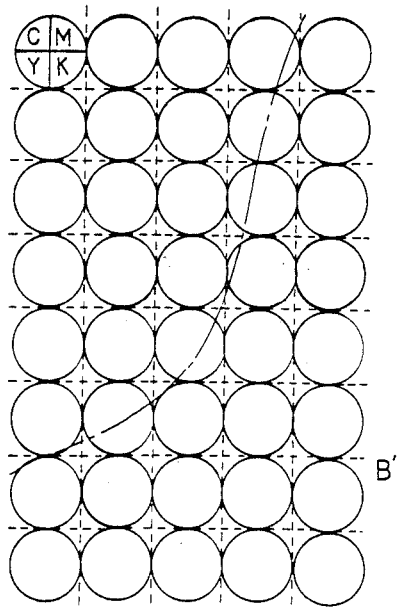
FIG. 6 (a) typically shows the quantization of the boundary at the square of one picture element when the condense is not applied thereto, (b) typically shows the quantization of the boundary at the square of each unit region of condense, and (c) typically shows the state of the boundary getting in the unit region of condense when performing the quantization of the boundary at the square of one picture element in case of (b)
Figure 6B:
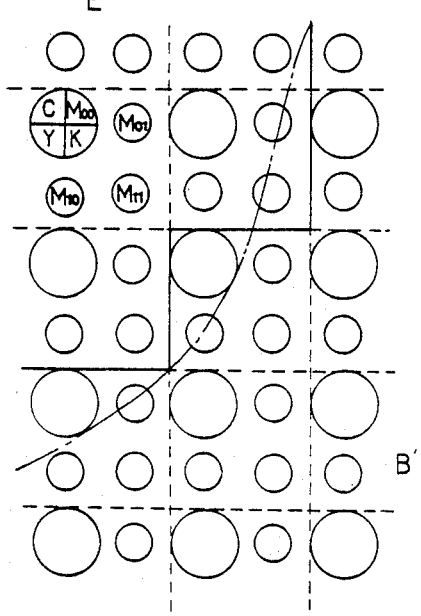
Figure 6C:
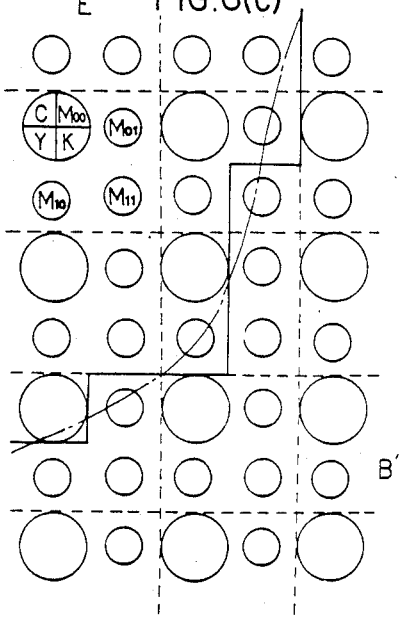

The (E') of FIG. 4 shows that the area surrounded by a curve forming the image (E') is superposed on the image (B') which was already rearranged. FIG. 6 is an enlarged view of the boundary portion of the rearranged image divided by said curve, and FIG. 6 (a) shows typically the state of the image data not condensed at all and in which a region of the image data is designated establishing that the picture element nearest to the curve is a minimum unit. On the other hand FIG. 6 (b) shows typically that the image is divided according to the designation of region establishing that the unit region of condense is a reference unit. When the contour in the boundary is of little importance, the unit region of condense in each image (B'), (E') can be easily put on the same coordinate system in such manner that the scanning line on the representative picture element in each unit region of condense does not get out of its position and that the tone of the reproducing image is exact. Accordingly, even when the contour is quantized establishing the unit region of condense to be a minimum unit, there remains no problem in the reproduced image.

There is, however, another case wherein the designation of region is performed establishing that the picture element is a minimum unit and more importance is given to the contour than the tone. FIG. 6 (c) shows an example of such cases. In this case, the boundary line for the designation of region gets into a single unit region of condense.

Even in this case, so far as the coordinate system between the image (B') and the image (E') is same and the relative positional relation between the unit region of condense and the representative picture element thereof remains unchanged, either these two images can be alternatively selected and, in most cases, the insufficiency or poor quality of the reproduced image is reduced or improved to the allowable extent by reproducing the image while applying an interpolating method thereto using the image signals in the four corners of an unit partition of interpolation as is disclosed in said Japanese laid open Publication No. Sho 55-22708.

Even when the condense of the same dimension is applied, however, in case of the reproduction in which the color signal of the representative picture element in each unit region of condense is applied to the whole unit region of condense, there still exists a problem of insufficiency in the reproduced image.

The substance of the problem and the solution thereof are described in detail hereinafter.

FIG. 7 shows the state in which the condensed image data are written in the magnetic disk when applying said condense and reproduction. The extent of condense in FIG. 7 is same as FIG. 2 except that the signals C, Y, K are subject to the following procession. In other word, FIG. 7 (a) shows that, in place of C, Y, K, the differences from their respective signals M, i.e., $c = C_{00} - M_{00}, y = Y_{00} - M_{00}, k = K_{00} - M_{00}$ are written in as color signals of the representative picture element. By writing in this manner, the same equation of reproduction can be applied to every picture element in the unit region of condense. Thus, establishing that subscripts (00), (01), (10), (11) show the positional relation between the representative picture element and the other picture elements, with respect to the representative picture element of (00), for example, it is possible to reproduce the image signal before condense according to the following equations of reproduction:

$$C_{00} = c + M_{00} = C_{00} - M_{00} + M_{00} = C_{00}$$

$$M_{00} = M_{00}$$

$$Y_{00} = Y + M_{00} = Y_{00} - M_{00} + M_{00} = Y_{00}$$

$$K_{00} = k + M_{00} = K_{00} - M_{00} + M_{00} = K_{00}$$

With respect to the picture elements other than the representative picture element, the similar equations are applicable thereto. With respect to the position of picture element of (01), the equations are as follows:

$$C_{01} = c + M_{01} = C_{00} - M_{00} + M_{01} = C_{00} + (M_{01} - M_{00})$$

$$M_{01} = M_{01} = M_{00} + (M_{01} - M_{00})$$

$$Y_{01} = y + M_{01} = Y_{00} - M_{00} + M_{01} = Y_{00} + (M_{01} - M_{00})$$

$$K_{01} = k + M_{01} = K_{00} - M_{00} + M_{01} = K_{00} + (M_{01} - M_{00})$$

With respect to the positions of (10), (11), the image signal before condense can be obtained in like manner.

According to the foregoing method of reproduction, although it is necessary to meet with the variation of color by each unit region of condense, since the $M_{01} - M_{00}$ common in the above four equations means a difference of brightness between the representative picture element and the picture element to be reproduced, it is possible to meet with the variation of brightness by each picture element.

In this connection, FIG. 7 (b) shows that considering the redundancy among the brightness values $M_{00}$, $M_{01}$, $M_{10}$, $M_{11}$ of FIG. 7 (a) as is described in detail in the applicant Japanese Application No. Sho 59-33296, the difference signals of $m_{01} = M_{01} - M_{00}, m_{10} = M_{10} - M_{00}, m_{11} = M_{11} - M_{00}$ are obtained and $m_{01}, m_{10}, m_{11}$ condensed by applying non-linear quantization thereto are written in the $m_{01}, m_{10}, m_{11}$ in place of $\acute{M}_{01}, \acute{M}_{10}, \acute{M}_{11}$ so that the capacity of the image memory may be further spared by several bits in comparison with the case where the $M_{01}, M_{10}, M_{11}$ are written in as they are.

In case of adopting said method of condense, when the image is selected at random in the boundary portion getting into the unit region of condense as shown in FIG. 6 (c), the image is insufficiently reproduced because in most cases there is no correlation between the images on both sides of the boundary line.

Figure 8A:
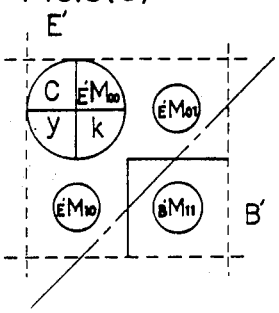
FIG. 8 (a), (b), (c) typically show the color signals weighted in proportion to the number of picture elements to be divided when the quantified boundary of the two images gets in the unit region of condense.
Figure 8B:
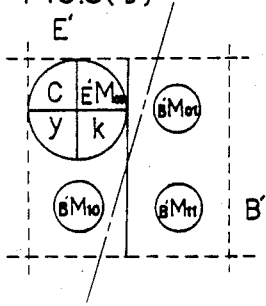
Figure 8C:
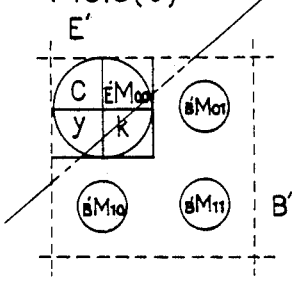

Referring to FIG. 8 showing typically some examples of such cases. When two images get into one unit region of condense, obtaining the average of the color signal weighted in proportion to the area (number of picture element) occupied by these two images in the unit region of condense, establishing the average to be the color signal of the representative picture element and selecting the brightness value corresponding to the boundary, the occurence of said insufficiency can be decreased. This is because by said process the brightness is finely reproduced corresponding to the boundary line, the color is reproduced to be an intermediate value of the two images and there remains no problem so far as the two images have similar colors. In case that the respective colors of the two images are different, a sober intermediate color between them not existing in either of the two original pictures is reproduced. In this case, such sober intermediate color is not so outstanding in the narrow width of one unit region of condense, and therefore there is no problem in the reproduction at all.

FIG. 8 (a) shows a case in which 2×2 picture elements are divided into 3 picture elements on the side of the image (E') and 1 picture element on the side of the image (B'). Taking the case of the color plate signal c, the color signal of the representative element can be obtained by weighting on the basis of $c = {}_EX \times \frac{3}{4} + c'_B \times \frac{1}{4}$ in case of FIG. 8 (a), $c = {}_EX \times 2/4 + c'_B \times 2/4$ in case of FIG. 8 (b) and $c = {}_EX \times \frac{1}{4} + c'_B \times \frac{3}{4}$ in case of FIG. 8 (c). The color signals of y, k are obtained in the similar manner.

Figure 9:
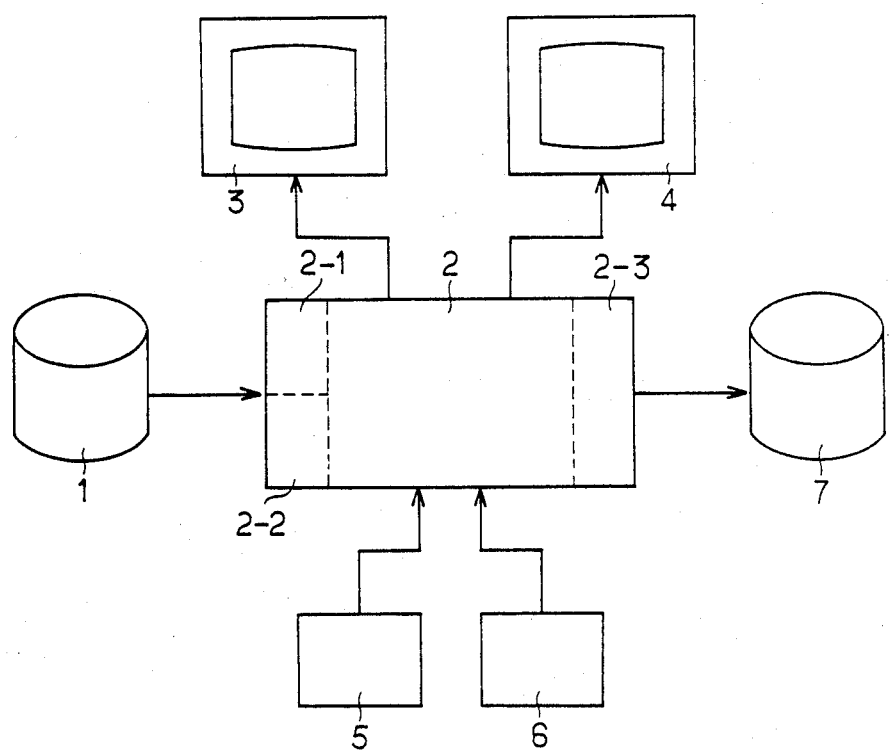
FIG. 9 is a block diagram showing one mode embodying the method of this invention.

FIG. 9 is a block diagram showing one mode of embodying the method of editing in accordance with this invention. In FIG. 9, numeral (1) is a memory for provisional storage comprising a magnetic disk device, and in said memory (1) image signals condensed by such method as disclosed in said Japanese laid open Publication No. Sho 55-22708 are stored in order of forming a line (FIG. 7, for example) by each unit region of condense and by each color original picture.

Numeral (2) in FIG. 9 is a processing unit comprising a CPU, an internal memory, an interface and others, and said processing unit (2) is equipped with a buffer memory (2-1) for image signal, a buffer memory (2-2) for mask signal, a buffer memory (2-3) for editing plate, respectively.

Numerals (3) and (4) are a color monitor for working and that for confirming rearrangement respectively, numeral (5) is a keyboard, numeral (6) is a digitizer table and numeral (7) is a memory for editing plate comprising a magnetic device for storing the image signals of which editing operation is completed.

Further, when it is necessary to apply a masking process with designation of priority by using any figure of closed-loop as is the image (E') of FIG. 4, a necessary figure for masking should be prepared beforehand and stored in the memory (1) in order of a line by each picture element being different from the image signal.

FIG. 10-1, 10-2 shows a flow chart of one mode of editing operation on the basis of said composition. When starting the editing operation. In the first step (I) the operator designates the size of the output image on actual dimension by means of the keyboard (5) based on the layout designation By this step (I), the size of the whole image to be displayed on the color monitor (4) for confirming rearrangement is calculated by the processing unit (2), and then the constant of proportion at the time of displaying the images output on the color monitor (4) from the memory (1) through the buffer memory (2-1) for image signal is calculated to be written in the internal memory of the processing unit (2).

In the second step (II), when the operator designates a specified image stored in the memory (1) by means of the keyboard (5), the designated image is displayed on the color monitor (3) for working, the signal volume of the image being specially condensed according to said constant of proportion.

In the third step (III), the operator inputs the trimming coordinates based on the layout designation by means of the digitizer table (6) while watching the image displayed on the color monitor (3). In such designation of the trimming coordinates, a designation of rectangle is so frequent that the coordinates of diagonal two points of the rectangle are designated in this connection, the coordinates actually designated is just the coordinates of the unit of picture element corresponding to the color original picture, but in order to establish the unit region of condense to be a minimum processing unit, by rounding off the coordinate value in the processing unit (2), the coordinates are converted to be on the convenient coordinate system for division in view of the unit region of condense in both vertical and horizontal directions, and are then written in the internal memory.

In the fourth step (IV), a process is performed for the case that more than two images each having priority are superposed one another (the superposing images (B') and (E') of FIG. 4, for example). In said process, according to the instruction from the keyboard (5), the mask signal is read from the memory (1) through the Buffer memory (2-2), the required masking figure is displayed on the color monitor (4), and watching said monitor (4) the position of the mask is designated by means of the digitizer table (6). In this case, when the masking figure is rectangular, it is possible to utilize the designated coordinates for the trimming in the previous step (III), but when the masking figure is formed into a closed-loop including any oblique line and curve, the position of the mask is designated on the fine coordinate system corresponding to the picture elements of the color original picture.

In the step (V), the image of the area of which trimming is designated in the previous step (III) is displayed on the color monitor (4) as figures (B') and (E') of FIG. 4, and the positional designation for the final output image is performed by way of the digitizer table (6). In this connection the round-off of the coordinate value is performed by the processing unit (2) so that the position may be designated on the coordinate system corresponding to the unit region of condense in the same manner as the step (III).

The foregoing layout operation described in the steps (I) to (IV) is performed for each color original picture, and after being confirmed in the step (VI) that the required number of color original pictures have been processed, the editing operation is further advanced to the following steps.

In the step (VII), the memory area corresponding to the size of the final output image designated in said step (I) is secured in a memory (7) for editing plate. Then in the step (VIII), the color original picture subject to the editing operation is designated, and at the same time the trimming coordinates, masking coordinates and the rearranging coordinates input in the foregoing steps (III), (IV), (V) are initially set as coordinates corresponding to the starting point.

Generally speaking, the editing operation of this embodiment comprises a process of reading the image data of 2 picture elements in width×1 line in length out of the memory (7) onto the buffer memory (2-3) while reading the image data of 2 picture elements in width×1 line in length out of the memory (1) onto the buffer memory (2-1) at the same time, a process of editing preferentially either of said image data according to the state of the masking signal, and a process of transferring it to the memory (7) by each unit of one line in length. In other words, in the step (IX), the data of 2 picture elements in width×1 line in length are read out of the memory (7) onto the buffer memory (2-3). In case that new image data are to be written in the address corresponding to said 2 picture elements in width×1 line in length and the image data corresponding to the "white color", for example, is preliminarily or already written in at the time of securing the memory area in said step (VII), this step (IX) is omitted jumping from the step (VIII) to the next step (X).

In the step (X), masking figure data of 2 picture elements in width×1 line in length are read out of the memory (1) onto the buffer memory (2-2), and further in the step (XI) the image data of the area correcponding to said 2 picture elements in width×1 line in length are read out of the memory (1) onto the buffer memory (2-1).

In the step (XII) an operation of establishing the unit region of condense to be a minimum unit using the masking figure data and the image data prepared in said steps (X) and (XI). In this operation, according to the masking figure data in each unit region of condense, it is discriminated that either the image data already written in the memory (7) or the image data from the buffer memory (2-1) should have priority.

Figure 11:
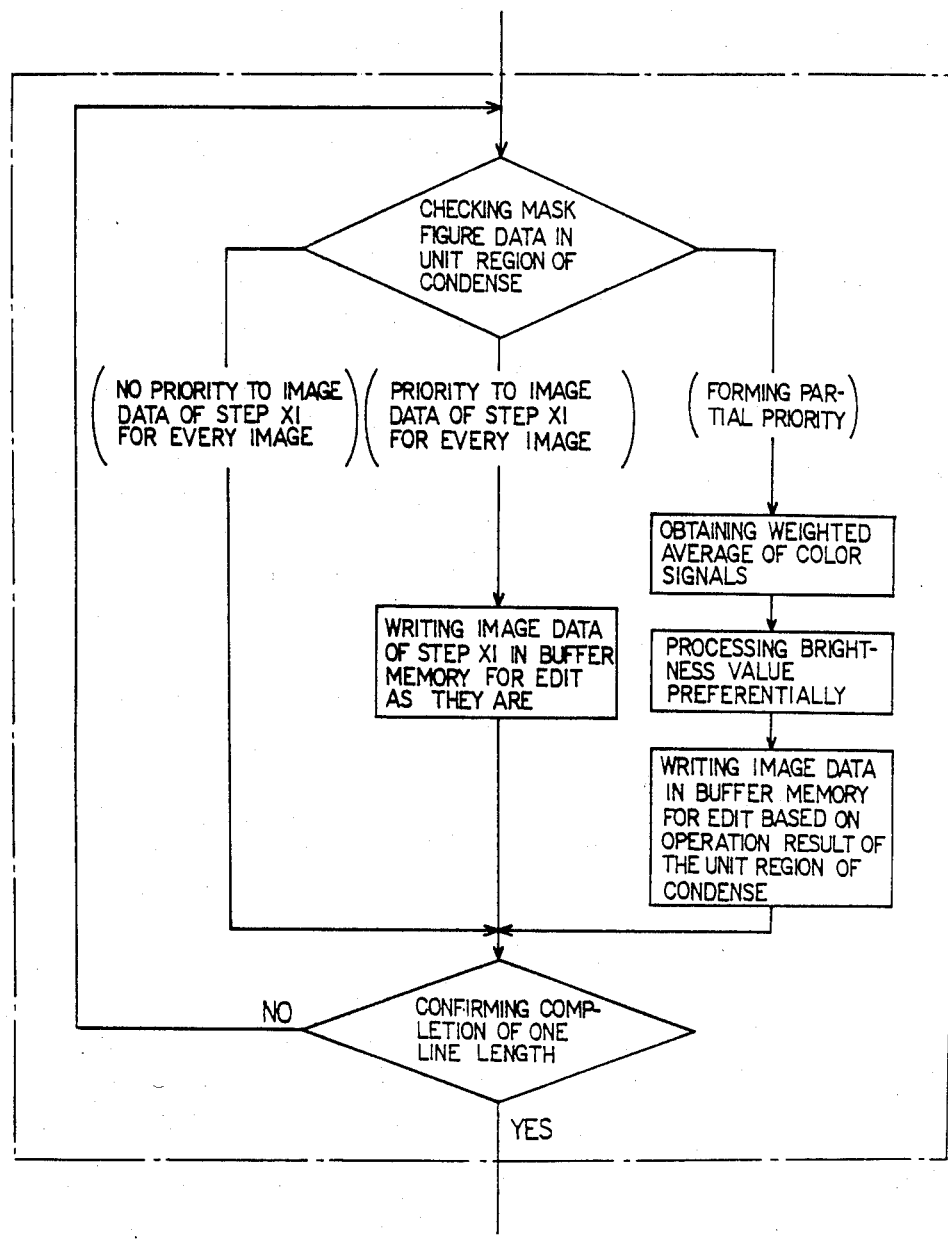

FIG. 11 is a flow chart showing an example of such operation, in which the masking figure data read in the step (X) is inspected and then it is discriminated whether the unit region of condense to be processed stretches over two images like the images (C') and (D')—or images (B') and (E') of FIG. 4 or not. Also it is discriminated either the image data written already in the memory (7) or the image data read out of the buffer memory (2-1) should have priority.

When it is discriminated from the masking figure data in the unit region of condense that the image data written in the memory (7) should have priority with respect to all of 4 picture elements of the unit region of condense (the image data in the step (XI) having no priority), the image data read out of the memory (7) in the step (IX) are kept as they are written in the buffer memory (2-3). When it is discriminated from the masking figure data in the unit region of condense that with respect to all of 4 picture elements the image data read out of the buffer memory (2-1) should have priority, the image data of this unit region of condense read out of the buffer memory (2-1) are written in place of the image data written in the buffer memory (2-3) in the step (IX).

On the other hand, when it is discriminated from the masking figure data that the region is located on the boundary line of different images, the aforementioned weighting is applied respectively to the image data from the memory (7) and the image data from the buffer memory (2-1) with respect to the color signal only, and the value of such weighted mean is once written in the buffer memory (2-3) as new color signal in the unit region of condense, and with respect to the brightness value the image data from the buffer memory (2-1) are written in the buffer memory (2-3) only with regard to the picture elements having priority.

When completing the above-described editing operation for one line in length, the editted image data of 2 picture elements in width×1 line in length are transferred to the memory (7) as the step (XIII), and thereafter in the steps (IX) to (XIII) the image data of 1 line in length corresponding to the unit region of condense (2 picture elements in this embodiment) are sequentially processed as one unit (or cycle) of editing operation, the steps (IX) to (XIII) being repeated until the process of one image is completed.

In the next step (XIV), it is confirmed whether the editing operation of one picture image is completed or not. When it is confirmed that the operation is not completed, said steps on and after the step (IX) are repeated, and when the completion is confirmed, it is further confirmed whether the editing operation of the required number of image pictures is completed or not. The steps on and after the step (VII) are repeated so long as the completion is not confirmed, and when the completion is confirmed, it means the completion of all the editing operation.

In the above-described embodiment, magnetic disk devices are used as memories for provisional storing and rearrangement, it is also possible to use the magnetic tape, optical disk or the like. Furthermore, the unit region of condense is not restricted to 2×2 picture elements described in the above embodiment, and such other picture elements as 3×3, 4×4 are also available as a matter of course.

It should therefore be understood that the foregoing relates to only preferred embodiments of the invention, and that it is intended to cover all changes and modifications of the example of the invention herein chosen for the purposes of the disclosure, which do not constitute departures from the spirit and scope of the invention.

I claim:

1. A method of editing image signal comprising a step of establishing a plurality of picture elements adjacent to one another on a color original picture to be an unit region of condense, a step of performing condense of image signal so that a representative picture element of said unit region of condense may have all of a plurality of image signals substantially corresponding to color signals required when reproducing the color picture image and that each picture element other than the representative picture elements may have only an image signal substantially corresponding to the brightness signal of said plurality of image signals, and a step of performing editing and rearrangement of image signal using the image signal condensed in said step, in combination with a step of establishing said unit region of condense to be a minimum unit for designation of coordinate position in the editing, and a step of performing the rearrangement of each image signal by the unit region of condense based on the layout designation under the same coordinate system as the editing.

2. A method of editing according to claim 1, wherein when a boundary line in the editing gets into the unit region of condense, a color signal obtained by weighting the color signals of each area of the unit region of condense divided by the boundary line in proportion to the number of the picture elements of said area is established to be a color signal of the representative picture element in the unit region of condense.

* * * * *